United States Patent [19]

Nelson

[11] Patent Number: 4,756,627
[45] Date of Patent: Jul. 12, 1988

[54] OPTICAL TEMPERATURE SENSOR USING PHOTOELASTIC WAVEGUIDES

[75] Inventor: Arthur R. Nelson, Stow, Mass.
[73] Assignee: Sperry Corporation, Blue Bell, Pa.
[21] Appl. No.: 641,643
[22] Filed: Aug. 17, 1984
[51] Int. Cl.$^4$ ............................................. G01K 11/00
[52] U.S. Cl. ...................................... 374/159; 374/161
[58] Field of Search ................. 356/44; 374/130, 131, 374/161, 159; 350/96.14, 96.13, 150; 250/227; 73/705

[56] References Cited

U.S. PATENT DOCUMENTS

| | | | |
|---|---|---|---|
| 3,695,747 | 10/1972 | Maldonado | 350/150 |
| 4,166,669 | 9/1979 | Leonberger et al. | 350/96.14 |
| 4,175,827 | 11/1979 | McMahon | 350/96.14 |
| 4,179,184 | 12/1979 | Nelson | 350/96.14 |
| 4,199,221 | 4/1980 | Rivoallan et al. | 350/96.14 |
| 4,284,663 | 8/1981 | Carruthers et al. | 427/164 |
| 4,295,739 | 10/1981 | Meltz et al. | 356/44 |
| 4,298,794 | 11/1981 | Snitzer et al. | 374/161 |
| 4,376,138 | 3/1983 | Alferness et al. | 427/160 |
| 4,437,761 | 3/1984 | Kroger et al. | 356/44 |
| 4,493,212 | 1/1985 | Nelson | 73/517 R |
| 4,547,262 | 10/1985 | Spillman, Jr. et al. | 350/96.12 |
| 4,561,718 | 12/1985 | Nelson | 350/96.14 |

FOREIGN PATENT DOCUMENTS 19908 2/1984 Japan .................................. 374/161

OTHER PUBLICATIONS

J. C. Campbell et al., "GaAs Electro-Optic Directional-Coupler Switch", Applied Physics Letters, vol. 27, No. 4, Aug. 15, 1975.
Photoelastic waveguides in LitaO$_3$ and LiNbO$_3$, A. Nelson, Applied Optics 19, Oct. 15, 1980, p. 3423.
Integrated Optic Temperature Sensor, L. Johnson and G. Pratt, Digest, Third Int'l Conference on Integrated Optics and Optical Fiber Communication, OSA/IEEE, Apr. 27-29, 1981, p. 130.
Fiber-Optic Measurement Instrument for Temperature, K. Kyuma, Conference on Lasers and Electrooptics, IEEE/OSA, Jun. 10-12, 1981, p. 102.

Primary Examiner—William A. Cuchlinski, Jr.
Assistant Examiner—W. Morris Worth
Attorney, Agent, or Firm—Arnold L. Albin

[57] ABSTRACT

An integrated-optic waveguide apparatus uses a photoelastic substrate for sensing temperature changes. Optical channels are formed in a photoelastic crystal substrate by depositing film stripes thereon to cause stress-induced changes in the relative refractive index responsive to changes in the substrate temperature. Absorption and coupling or switching of light waves between the channels provides a variable light intensity as a function of temperature. A single-mode temperature sensor of the interferometer type provides high sensitivity without requiring a secondary reference light source. Multimode temperature sensors are also described which exhibit a wide dynamic range useful up to several hundred degrees C. at a slight compromise in sensitivity.

6 Claims, 3 Drawing Sheets

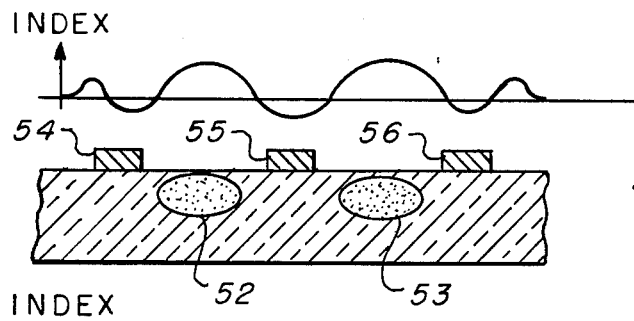
FIG.2.1.
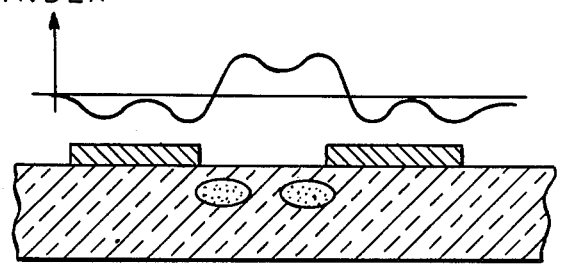
FIG.2.2.
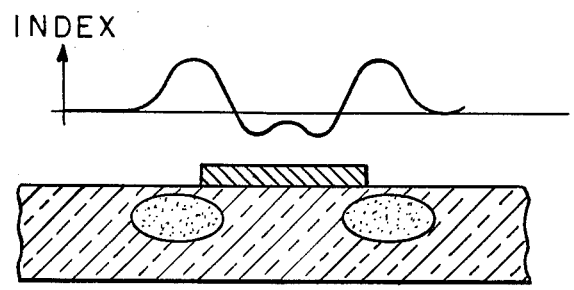
FIG.2.3.
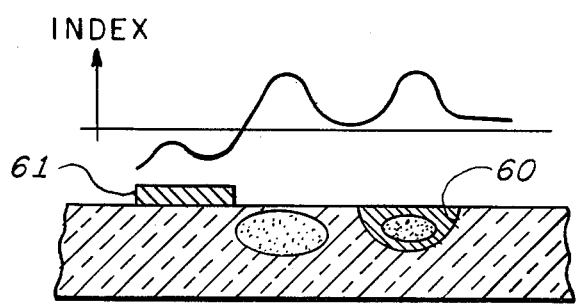
FIG.2.4.
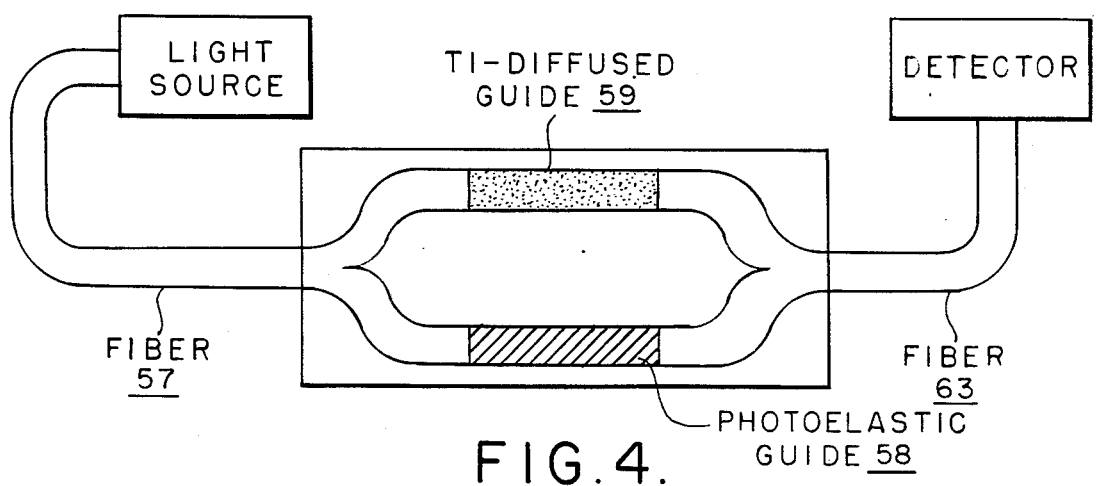
FIG.4.

OPTICAL TEMPERATURE SENSOR USING PHOTOELASTIC WAVEGUIDES

BACKGROUND OF THE INVENTION

1. Field of the Invention

The present invention relates generally to the field of temperature measurement using optical techniques and, more particularly, to a temperature sensor employing a photoelastic substrate having a stress induced optical waveguide with temperature dependent index of refraction.

2. Description of the Prior Art

Various measuring structures are known for temperature sensing by measuring the intensity of a light beam. Usually associated with a fiber optical transmission line, these measuring devices have included birefringent temperature sensors which exploit temperature dependent birefringing effects of various crystals, the temperature dependent phosphorescence decay time of phosphors, and interference and absorption effects in crystals employing optical waveguides with temperature dependent refractive indices. Such optical waveguides have utilized an optically transparent crystal such as gallium arsenide (GaAS), lithium tantalate ($LiTaO_3$) or lithium niobate ($LiNbO_3$) and form a channel for guiding light wave energy characterized by a change in the refractive index of the material. The refractive index change leads to the formation of an optical waveguide in a region wherein the refractive index is increased relative to the surrounding area, or decreased relative to the surrounding area. Light travelling in a medium having a transverse variation in refractive index is reflected towards regions having the larger refractive index, as is well known in the art.

Such waveguides have heretofore been formed, for example, by diffusing a transition metal such as titanium (Ti) into a $LiNbO_3$ crystal substrate to form a guiding layer of increased refractive index, as by evaporating a thin layer of the metal on the surface of the crystal and then heating the crystal to a suitable temperature for diffusion into the substrate.

In photoelastic Effect Optical Waveguides, U.S. Pat. No. 4,561,718, filed Aug. 22, 1983 and issued Dec. 31, 1985 to the present inventor and assigned to the assignee of the present invention, photoelastic guides were disclosed, using evaporated metal or insulating dielectric stripes on $LiTaO_3$ and $LiNbO_3$ substrates. These guides, which are capable of multi-mode propagation, were observed to offer significant advantages over the previously used single-mode Ti-diffused guides in $LiNbO_3$, as reported by the present inventor in Photo-Elastic Waveguides in $LiTaO_3$ and $LiNbO_3$, Appl. Opt. 19, 3423 (1980). In devices using the photoelastic effect, the waveguide is caused, at least in part, by the effect of changing the refractive index by the stress field in the semiconductor material surrounding a deposited stripe, or in a window formed between a plurality of such stripes. This stress field often results from the state of compression or tension induced by the deposited film due to the differing thermal expansion coefficients of the substrate and the deposited film after cooling from the elevated temperature required for deposition. Using the photoelastic effect, it is possible with the correct pattern of an evaporated film to produce regions of permanently increased and decreased refractive index that will guide light without application of bias voltages.

Interferometer-type integrated optics structures making use of the index change of the guide and coupling region and the change in guide length with temperature were described by L. M. Johnson and G. W. Pratt in Integrated Optic Temperature Sensor, Digest, Third International Conference on Integrated Optics and Optical Fiber Communication, Apr. 27-29, 1981, pp 130-131. However, this system and similar interferometer devices using the technology of single mode transmission through Ti-diffused guides in $LiNbO_3$ has relatively low sensitivity and restricted dynamic range. The modulated light output goes through periodic maxima and minima, requiring additional circuit complexity for counting the cyclical variations or otherwise compensating for such ambiguities over an extended temperature range.

Another arrangement based on semiconductor absorption with temperature offers a continuous relation of output voltage vs. temperature over a limited dynamic range, but is subject to errors induced by variations in power at the light source, thereby requiring incorporation of a second light source to provide a reference. This structure was described by K. Kyuma, et al, Fiber-Optic Measurement Instrument for Temperature, Digest, Conference on Lasers and Electro-optics, June 11, 1981, pp. 102-103.

A further optical temperature sensor using the principle of varying light intensity by reflection from semiconductor dielectric interfaces with a temperature dependent index of refraction was disclosed by H. Kroger and R. A. Soref in Refractive Index Sensor, U.S. Pat. No. 4,437,761, filed Mar. 27, 1981, and assigned to the present assignee. However, this sensor is limited by choice of the reflecting dielectric parameters to a compromise between dynamic range and temperature sensitivity.

The present invention is comprised of an integrated optic sensor with increased sensitivity and dynamic range over the prior art, providing a direct conversion of temperature deviation to intensity modulation of the light signal which is substantially insensitive to undesirable environmental perturbations. The sensors described use photoelastic waveguides and either single mode or multimode technology.

SUMMARY OF THE INVENTION

According to the invention, an optical waveguide temperature sensor comprises a substrate of optically transparent photoelastic material with a first thermal coefficient of expansion. An input region is provided to couple light to be guided into the substrate. A film with a second thermal coefficient of expansion is then deposited on the substrate, patterned to extend from the input region to an output region. The disparate expansion coefficients of the film and substrate result in a stress applied to the substrate. The stress induces formation of a photoelastic waveguide which thereby couples at least a portion of the light from the input region to the output region, responsive to temperature changes.

The substrate may also be provided with a second photoelastic waveguide in proximity to the first waveguide, also coupled by a deposited film. A single-mode light source is coupled to one of the first and second waveguides, the coupling between the guides providing a relative output from each guide that will vary in response to temperature changes. The outputs from the waveguides are coupled to corresponding light detectors. The detector outputs may be combined in a manner to give a single intensity change with temperature that is independent of changes in output of the light source.

In a further modification, one of the two waveguides comprises a temperature independent single-mode waveguide. Single-mode light energy coupled to the input region is apportioned between the temperature independent waveguide and a single-mode photoelastic waveguide. The light travelling through the photoelastic channel, which experiences a change in phase relative to the temperature independent channel in accordance with a change in temperature, may be combined with light exiting the diffused channel in phase-coherent relationship to provide an output whose intensity is a function of temperature.

Other embodiments use a temperature-sensitive photoelastic channel to create an index barrier that will reflect or divert incident light and reduce throughput of light in the substrate.

BRIEF DESCRIPTION OF THE DRAWINGS

FIG. 2 shows representative curves of the effective index of refraction as a function of stripe geometry for useful guide configurations, for both single and multimode applications.

FIG. 4 shows an embodiment of an interferometer-type photoelastic waveguide in plane view.

DESCRIPTION OF THE PREFERRED EMBODIMENTS

Figure 1:
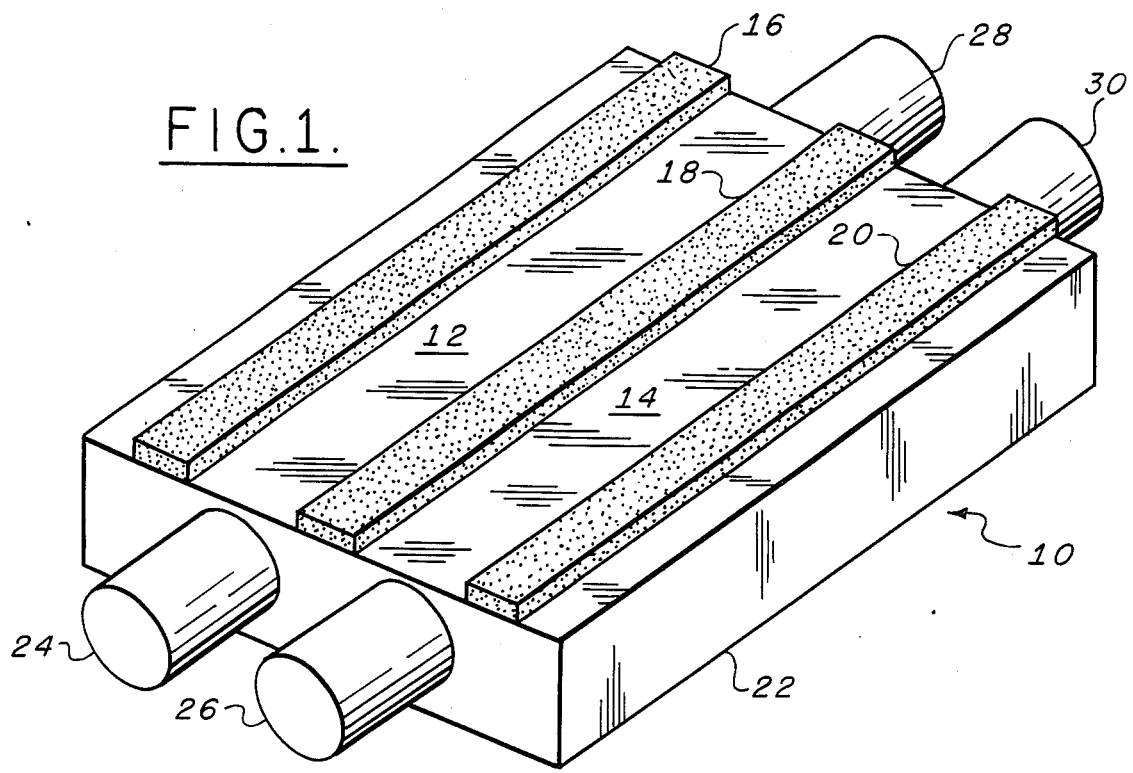
FIG. 1 is a perspective view of a two-channel integrated-optic temperature sensor using photoelastic technology.

Referring to FIG. 1, photoelastic waveguide 10, constructed in accordance with the principles of the present invention, may include light waveguide channels 12 and 14 created by depositing an appropriate metal or dielectric film 16, 18, 20 on a photoelastic substrate 22. Suitable processes for such deposition are described in the aforementioned U.S. Pat. No. 4,561,718. The stress from the deposited stripes of metal or dielectric having a thermal coefficient of expansion substantially differing from that of the substrate causes increases or decreases in the substrate index of refraction which are a function of temperature and the creation of optical waveguides in the substrate proximate to the film stripes. In this embodiment, two photoelastic waveguides are created in proximity to each other, such that evanescent wave coupling between the guides occurs; that is, a finite amount of the optical energy due to a mode propagating in a first waveguide will be found outside of that waveguide. When this energy impinges on a second nearby waveguide, light can couple between the guides. Since this coupling phenomenon is dependent on the separation and coupling length of the guides, over a long enough distance, which may be determined by solution of the well-known electromagnetic equations of propagation, substantially all of the light energy may be transferred or switched from one guide to another of similar structure. It may be seen by symmetry that once all or almost all of the light has coupled to the second waveguide, the process will reverse over the next waveguide segment, with the light now coupling from the second waveguide to the original propagating waveguide. Thus, the light energy is exchanged periodically and continuously by the guides without application of a voltage or other external influence. Any influence that acts to change the index of refraction of the guides, the index of refraction of the coupling region between the guides, or the coupling length of the guide, will change the periodicity of the coupling and hence result in transferring at least a portion of the light from one output port to the other output port. This change in periodicity is the basic principle underlying the operation of the present invention, and is well known to those skilled in the art.

In the present invention, the guide is constructed such that the stress-induced refractive index change is strongly dependent on temperature. For example, parallel stripes of a metal film with a large thermal expansion coefficient, such as gold, may be evaporated at an elevated temperature upon a substrate with a much smaller thermal expansion coefficient, such as gallium arsenide. Alternatively, a dielectric such as silicon dioxide may be deposited, using conventional photolithographic techniques. Upon cooling to room temperature, a large stress develops due to the differential rate of contraction. The index of these guides depends strongly on the substrate temperature. With continued reference to FIG. 1, any change in temperature experience by the substrate 22 will cause an increase or decrease in stress, thus modifying the refractive index of the guides 12, 14 and causing a transfer of the light energy incident at ports 24 or 26 between the two output ports 28 and 30. With symmetry of construction, the refractive index of each guide will change equally with temperature. With fabrication by the techniques described herein, the index of refraction of these waveguides can be made very sensitive to temperature, and as a result, a single-mode optical temperature sensor can be constructed to detect changes in temperature of less than $10^{-7}$° C. Previous optical temperature sensors constructed from Ti-diffused guides in $LiNbO_3$ provided lesser sensitivities of the order of $5 \times 10^{-2}$° C. Thus, the present invention is capable of providing an improved sensitivity by a factor of 10,000 over the prior art.

Fabrication methods for a sensor using photoelastic wavegudies are described in detail in U.S. Pat. No. 4,561,718, which is incorporated herein by reference. A metal or dielectric material is deposited on an appropriate substrate, at an elevated temperature, and on cooling, the differing thermal coefficients of expansion result in stresses occurring in the substrate crystal, such that waveguides are formed by zones of increased or decreased refractive index. If two waveguides are formed within one to ten wavelengths of light separation, light will couple periodically between the guides. Examples of some of the physical structures useful for forming two coupled guides are given in FIG. 2 for the case where the stripe material expansion coefficient is greater than the substrate expansion coefficient. FIG. 2.1 shows the creation of two strong guides 52, 53 by the use of three stripes of deposited material 54–56. This device is illustrated in FIG. 1. Geometrical factors effecting the formation of the guides include the stripe width, depth, and spacing between stripes. In said Ser. No. 525,067 it was observed that permanence of the waveguides was enhanced by a heat treatment after deposition.

FIG. 2.2 shows how two guides may be created by using only two stripes deposited on a substrate. Optical confinement is provided in discrete regions, and the degree of interaction is determined by the strip geometry. The beams are strongly confined by the relatively large increase in the refractive index at the stripe edges.

Two coupled guides can even be created with only one stripe of the appropriate width as shown in FIGS. 2.3.

A further variation is shown in FIG. 2.4 where a diffused guide 60 is combined with a photoelastic guide 61 to provide a sensor with a stronger temperature dependence. The diffused guide is formed by deposition of an overlying metallic film, such as Ti, and a heat treatment to cause diffusion of the film into the substrate to form a permanent guide. The photoelastic guide is formed by conventional photolithographic deposition and etching, which may be followed by annealing to stabilize the guide.

The dependence of the formation of the guide on the width of the stripe and the window between adjacent stripes is discussed in Photoelastic Waveguides and Their Effect on Strip-Geometry GaAs/Ga$_{1-x}$Al$_x$ As Lasers, P. A. Kirkby and P. R. Selway, 50 *J. Appl. Phys.* (7), July 1979, 4567–4579.

The above examples were shown for the case where the stripe thermal coefficient of expansion is greater than that of the substrate coefficient of expansion. Where the converse is true and the material with a lower coefficient of expansion is deposited on the substrate, the index distributions will be inverted from those shown in FIG. 2.

Figure 3:
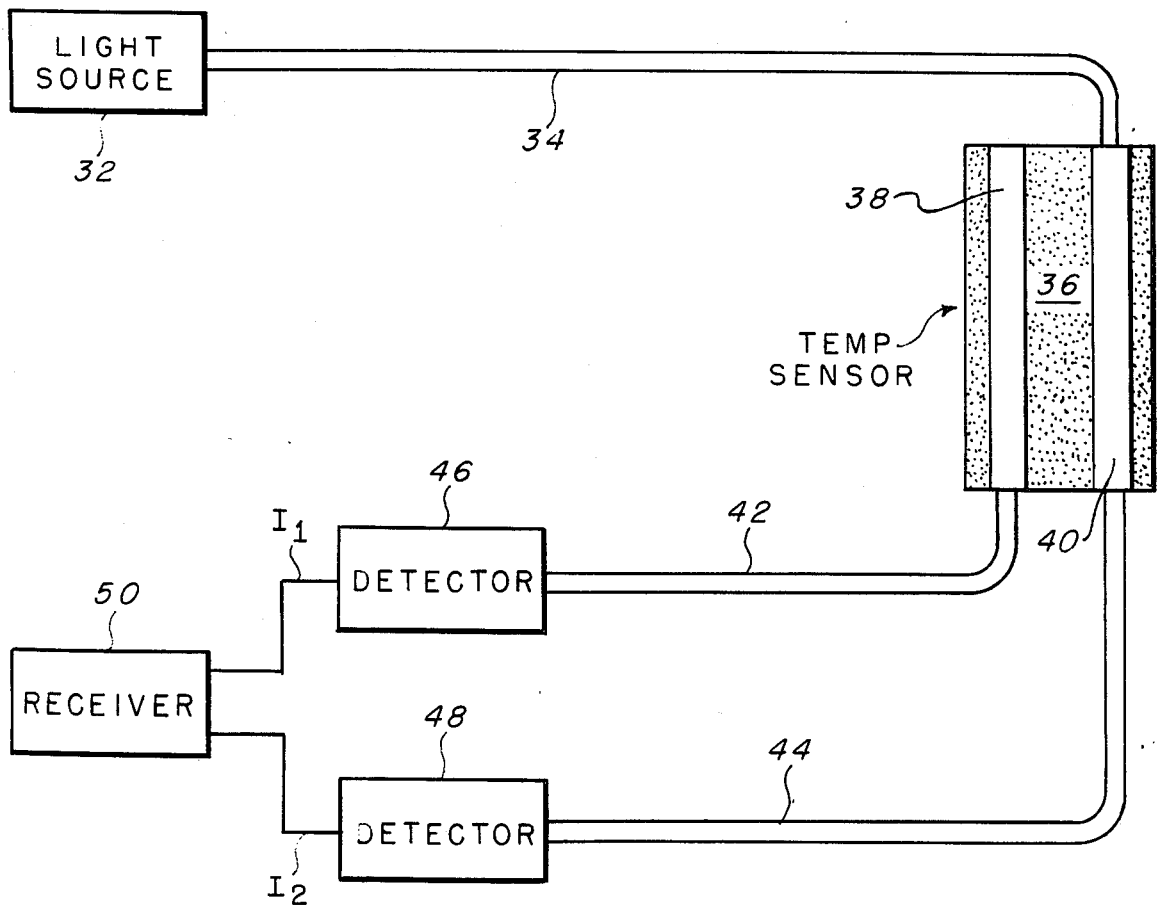
FIG. 3 is a schematic diagram of a system for measuring temperature change employing the embodiment of FIG. 1.

A temperature sensor system for single-mode applications using the waveguide of FIG. 1 is shown in FIG. 3. Light source 32 provides a coherent optical signal which is guided through a single-mode optical fiber 34 to a temperature sensor 36. The sensor shown here is a two channel device, including waveguides 38 and 40. Preferably, two single-mode fibers 40 and 42 are used to transmit the signals from the sensor 36 to two independent detectors 46 and 48 and then to a receiver 50 which may be located for convenience near the light source 32. The use of two single-mode fibers for return paths from the sensor is advantageous in that signal processing can be used to improve performance. For example, the output signals $I_1$ and $I_2$ from the two detectors may be processed in the receiver 50 to provide the terms $I_1-I_2$ and $I_1+I_2$, which terms are then divided in the receiver 50 to provide the output signal. This procedure provides increased sensitivity of the system and reduces errors due to variation in power at the light source, since both numerator and denominator are proportional to the power output of the light source. This arrangement is an improvement over other temperature sensors based on absorption effects which require a separate light source operating at a second wavelength for a reference. The fiber optic system herein has the usual advantages of fiber optic systems in that it is passive (no electrical power required at the sensor locations), the sensor can be multiplexed, and all the usual benefits of fiber optic transmission—such as low signal attenuation, high information transfer capacity and flexibility, and freedom from electromagnetic interference—apply to the sensor system.

An integrated-optic temperature sensor of the interferometer type can be constructed as shown in FIG. 4. An input optical fiber 57 splits into two arms which respectively feed photoelastic waveguide 58 and Ti-diffused guide 59 which then recombine at output fiber 63. Each waveguide section is dimensioned to operate single mode. While the effective index of refraction of the Ti-diffused guide is essentially constant with temperature, the effective index of refraction of photoelastic guide 58 is strongly dependent on temperature. This temperature dependence is much more pronounced than that obtained with earlier interferometer temperature sensors which relied on a path length difference of the waveguides with temperature. Light travelling in the photoelastic guide 58 experiences a change in phase relative to the permanent Ti-diffused guide 59 in accordance with the change in temperature. Upon recombining, the phase change is observed as an intensity change at the device output. Since the output of the device is sinusoidal, it cannot simultaneously provide a wide dynamic range and high resolution. However, it is adaptable to methods used in the prior art of counting maxima and minima or introducing a compensating signal to provide a continuous output with temperature change.

Figure 5:
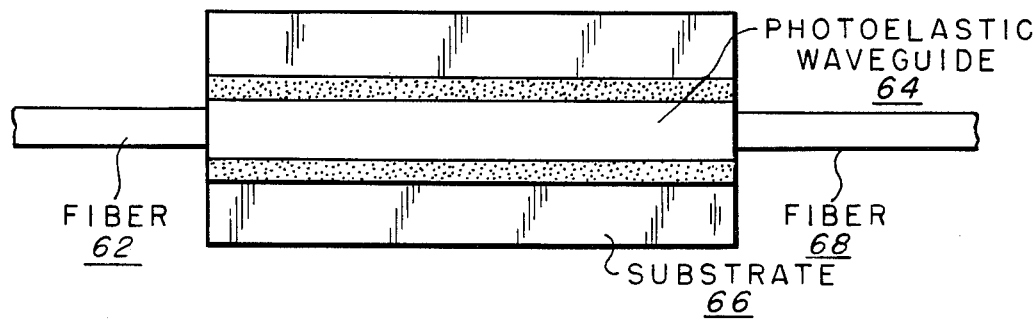
FIG. 5 shows a guided-to-unguided photoelastic sensor in plan view.
Figure 6:
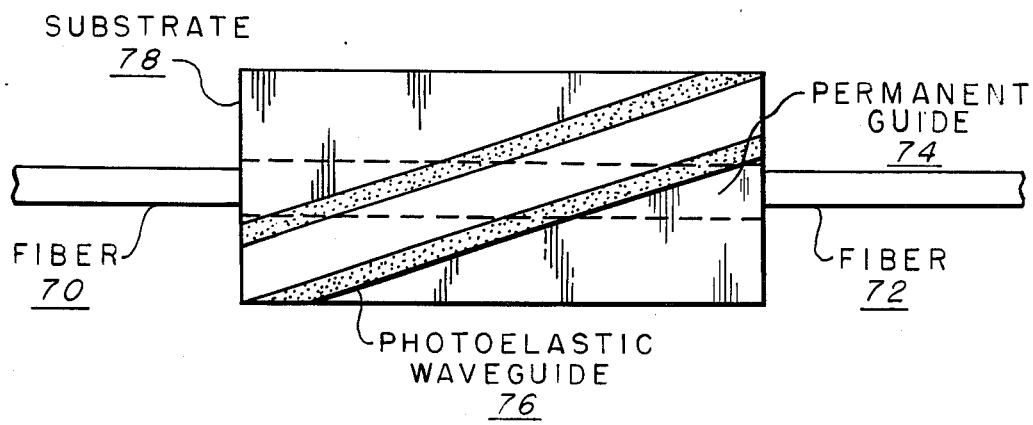
FIG. 6 shows a plan view of a composite waveguide utilizing a diffused waveguide channel and a photoelastic waveguide barrier channel.
Figure 7:
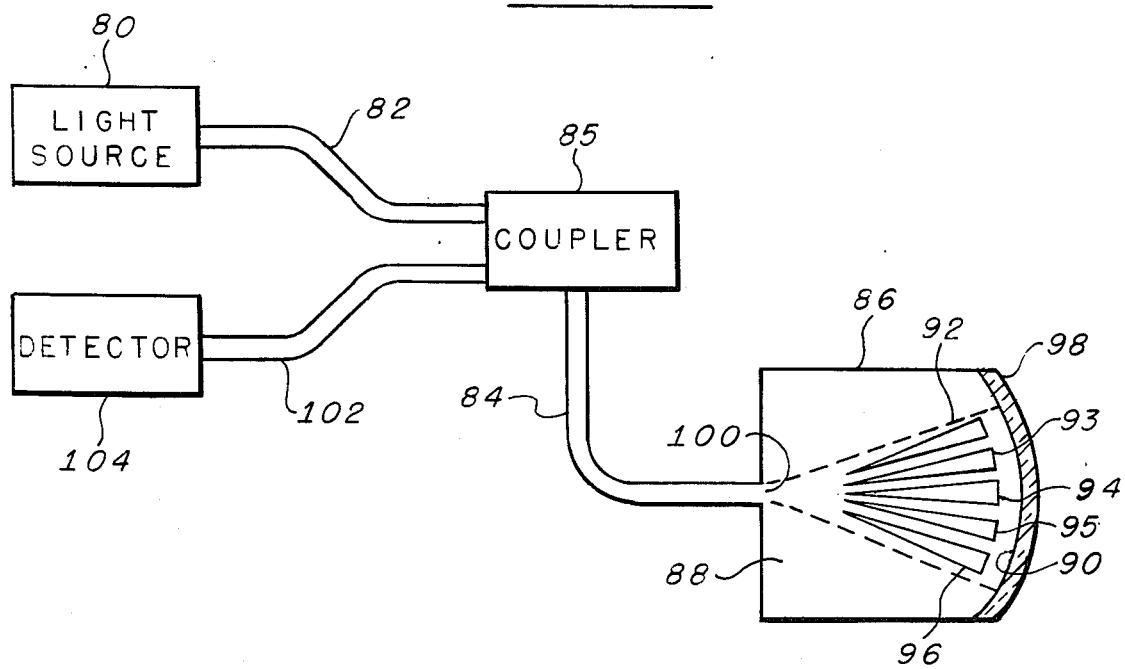
FIG. 7 shows an optical temperature sensor system having a cylindrical reflecting surface and a plurality of index barriers.

In FIGS. 5–7, optical temperature sensors are shown that use photoelastic guides and either single-mode or multimode (incoherent) light sources. The ultimate temperature sensitivity or resolution is one-to-two orders of magnitude less than for the single-mode devices of FIGS. 2 and 4. The dynamic range is very large since the modulated light output from these devices does not exhibit periodic maxima or minima. Instead, the light output changes smoothly from a minimum value near zero to a maximum value over the entire device temperature range of several hundred degrees C. Such a device is able to resolve temperature changes as small as $10^{-5\circ}$ C. and enjoys all the other benefits of fiber optic sensors. Since it does not depend on single-mode technology, it may employ either single or multimode light. Moreover, since it is not phase dependent, the operation is not materially degraded by environmental changes which could introduce errors due to pressure sensitivity.

FIG. 5 shows a relatively simple construction of a device of this type. It provides a temperature sensor whose throughput is a function of substrate temperature. A single stress-induced waveguide 64 is shown on a photoelastic substrate 6 and may be formed by depositing two metal stripes on the substrate. Input fiber 62 and output fiber 68 are butt-coupled to the respective ends of the substrate. At low temperatures, the waveguide defined by a region of increased refractive index between the stripes couples most of the input light energy into the output side of the waveguide at fiber 68 (The device possesses reciprocal operation with respect to input and output). As the temperature is increased, the deposited film relaxes by virtue of its greater coefficient of expansion with respect to the substrate 66, thereby reducing the stress and the associated refractive index difference, thus weakening the guide and resulting in loss of light from the guide, reducing the light throughput to fiber 68. At an upper temperature extreme which is approximately at the original stripe deposition temperature, the stresses will be essentially relaxed, and the device will be ineffective as a waveguide, resulting in extremely small optical thoughput. If the guide depth and width dimensions are comparable to the wavelength of the input light, the sensor can be operated single mode. If the dimensions are substantially increased so that multiple modes may be propagated, and the temperature coefficients of the materials are such that a strong waveguide is produced, then the device can effectively be operated multimode.

An integrated-optic temperature sensor that uses an index barrier created by a photoelastic guide is shown in FIG. 6. A light source introduced in input fiber 70 is guided from the input through the substrate 78 to output fiber 72 by a permanent diffused guide 74 or by any other of the various methods which have been described in the literature for making permanent waveguides. A photoelastic guide 76 is created at an angle of 1° or 2° to the permanent guide 74. Guide 76 is a region of increased refractive index and reflects incident light as a function of temperature and thereby varies the device throughput. Thus, at low temperatures, the index barrier will be strong and there will be substantial diversion of the input light wave energy. At high temperatures, where the stress induced barrier is relaxed, the photoelastic guide will have little effect, and substantially all the incident light will be transmitted to fiber 72. This embodiment has a sensitivity in range of operation similar to that of the embodiment of FIG. 5.

Another configuration suitable for multimode application is shown in FIG. 7. Fabrication procedures for an electroelastic waveguide application of similar construction are reported by the inventor and R. A. Soref, et al, in Active Fail-Safe Terminal for Fiber-Optic Data Bus, *Appl. Phy. Lett.* 32(7), Apr. 1, 1978, 408–410. Incident light from source 80 is applied to a first end of optical fiber 82 and thence to fiber 84 through bidirectional coupler 85. A photoelastic substrate 86 having a planar focal surface 88 and an opposing circular cylindrical surface 90 has deposited thereon a plurality of stressed film stripes, exemplified by elements 92, 94 and 96, which are bounded by a concave reflector 98 having a circular cylindrical surface 90 and a center of curvature 100 at the focal plane 88. Light rays incident on the focal plane at center 100 are reflected at surface 90 and directed back to fiber 84 and thence split off by directional coupler 85 which diverts the exiting light rays to fiber 102 and detector 104. It may be seen that the stressed films 92–96 variably change the refractive index in the crystal according to temperature to form optical waveguides which are defined by the film contours. At low temperatures, the photoelastic barriers stress the substrate to increase the refractive index in the guides which deflect incident light from reaching the mirror 98 and also defocus light returned from mirror 98 so that it is no longer focussed at point 100. The effect is to reduce the throughput of the system at low temperatures. At high temperatures near the deposition temperature of the barrier, the stressed areas of the substrate are essentially relaxed, thus transmitting the incident light rays undeflected, permitting substantially complete reflection of the light incident on mirror 98. Thus, the optical energy received by detector 104 is a function of temperature. Since this is essentially a reflective device, not dependent on interferometer phenomena, it is suitable for multimode applications as well as single mode.

Accordingly, it is seen that a temperature sensor constructed in accordance with the above embodiments will be more sensitive than previous temperature sensors using only diffused integrated optic structures. The prior art devices make use of the index change of the guide and coupling region and the change in guide length with temperature. However, the previous devices have used a standard technology of Ti-diffused guides in $LiNbO_3$. The change in guide parameters with temperature which can be achieved with the prior art devices is small compared to the temperature effect expected for photoelastic guides formed by thermally induced stress effects in $LiTaO_3$. By choosing a combination of film and substrate with a very large difference in thermal expansion coefficients, sensitivities orders of magnitude greater than the prior art are obtained.

The sensitivity of a multimode sensor which relies on a barrier interposed in the light path can be estimated by assuming that at 500° C. the stress film will be totally relaxed, and that a 100% modulation or change in light output from the "on" to the "off" state will be obtained with respect to 0° C. From shot noise theory, it may be shown that a change of $10^{-8}$ in electrical output signal can be detected with a 1mW optical signal on the detector and a 1 Hz electrical signal bandwidth at the detector. Assuming an essentially linear relationship between refractive index and temperature change, therefore, the smallest temperature change that can be detected is $$500° C. \times 10^{-8} = 5 \times 10^{-6°} C. \tag{6}$$

The dynamic range is limited only by the detector electronics. If the narrow bandwidth assumed above can be obtained, then a detector dynamic range of 100 dB should be readily attainable.

A somewhat different analysis is required for single-mode devices which rely on the change in coupling coefficient between adjacent waveguides. Since the coupling factor between the guides is more highly dependent on temperature change than is the modulation index obtained in an absorption guide, it is estimated that a temperature change as small as $10^{-7°}$ C. may be resolved.

Both the coupled guides and interferometer devices are based on detecting changes in the phase of the propagating light due to the temperature induced refractive changes. Because of the phase dependence, this type of sensor is very sensitive to small changes in temperature. It may be seen that the sensitivity determined by the above approximations is far greater than the prior art and can be further increased by choosing materials with greater differences in thermal coefficient of expansion than in the examples above, which were based on experiments with aluminum stripes on a GaAs substrate. The sensitivity and dynamic range of the temperature sensor can be optionally varied by the choice of materials for film and substrate. For example, gold with an expansion coefficient $\alpha$ of $13 \times 10^{-6}/°C.$ on GaAs with $\alpha \approx 6 \times 10^{-6}/C$ at an elevated deposition temperature has produced strong guides that will be very temperature dependent. Chromium (Cr) with $\alpha \chi \times 7 \times 10^{-6}/°C.$ on $LiTaO_3$ with $\alpha = 5.7 \times 10^{-6}/°C.$ at elevated temperatures has also produced strong guides, but here the guiding is mainly due to the inherent stress of the evaporated Cr film, and the variation in refractive index with temperature will be smaller. However, the effective useful dynamic range for temperature change would be larger in this case. Maximum sensitivity will be obtained by using materials with the largest difference in thermal expansion coefficients. Fused quartz with $\alpha = 0.5 \times 10^{-6}/°C.$ for the substrate and aluminum (Al)

stripes with $\alpha = 25 \times 10^{-6}/°C$. afford a combination for a sensor with the highest temperature sensitivity because of the large difference in thermal expansion coefficients.

In addition to the extremely high sensitivity, the sensor and sensor systems disclosed have the advantage of being passive and provide all the well-known advantages of fiber optic transmission. The interferometer sensor disclosed has the advantage of not requiring a separate reference light source as is required for prior art temperature sensors based on optical absorption. The single mode devices of the present invention are not subject to the temperature and pressure environmental errors of the prior art. Prior art interferometer sensors, for example, require two fibers, one of which is used for a reference. Pressure and temperature differences applied to the sensing fiber and the reference guide result in phase errors in the combined output signals. However, as shown in FIG. 4, the present invention uses only a single input cable, and the signals enter the guides immediately after division in the substrate. Since the guide dimensions are extremely small, any environmental effects on the substrate and combined signal are neglible, except for the intended response to temperature changes.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. An apparatus for optically sensing temperature changes, comprising a source of light energy, a light detector, a receiver coupled to said detector, and temperature sensing means interposed between said source and said detector, wherein said temperature sensing means comprises:

an optically transparent photoelastic substrate having a planar surface and an input region whereat light energy is coupled for guidance therein, an index of refraction responsive to stress applied thereto, a first thermal coefficient of expansion, and an output region for extracting at least a portion of said light energy, a film having a second thermal coefficient of expansion deposited upon said planar surface of said substrate in a predetermined pattern extending from said input region to said output region, said film defining first and second photoelastic waveguides proximate thereto and residing within said substrate, corresponding to regions of stress induced change in index of refraction responsive to said temperature changes, for coupling said portion of said light energy from said input region to said output region, differences of said first and second thermal coefficients of expansion applying a stress to said substrate that varies said index of refraction corresponding to said waveguide, said variation in index of refraction varying said portion of light inversely according to said temperature changes, said film having longitudinal portions spaced a predetermined distance therebetween for coupling said first and second waveguides, said coupling responsive to temperature changes of said film and said substrate, means for coupling single-mode light rays from said source of light energy to one of said first and second waveguides, and means for coupling said first and second waveguides, respectively, to said light detector, said light detector further comprising first and second detector means coupled to said first and second waveguides, respectively.

2. Apparatus as set forth in claim 1, wherein said first and second detector means provide corresponding electrical signals indicative of light signals emitted from said first and second waveguides, respectively.

3. Apparatus as set forth in claim 2, said receiver further comprising means for providing electrical signals representative of algebraic sums and differences of said first and second electrical signals, and means for providing a further signal indicative of a quotient of said sums and differences.

4. An apparatus for optically sensing temperature changes, of the type having a source of light energy, a light detector, and temperature sensing means interposed between said source and said detector, wherein said temperature sensing means comprises:

an optically transparent photoelatic substrate having a planar surface and an input region whereat light energy is coupled for guidance therein, an index of refraction responsive to stress applied thereto, a first thermal coefficient of expansion, and an output region for extracting at least a portion of said light energy, a film having a second thermal coefficient of expansion deposited upon said planar surface of said substrate in a predetermined pattern extending from said input region to said output region, said film defining a photoelastic waveguide proximate thereto and residing within said substrate, corresponding to a region of stress induced change in index of refraction responsive to said temperature changes, for coupling said portion of said light energy from said input region to said output region, differences of said first and second thermal coefficients of expansion applying a stress to said substrate that varies said index of refraction corresponding to said waveguide, said variation in index of refraction varying said portion of light inversely according to said temperature changes, an optical waveguide disposed in said substrate and essentially independent of temperature and coupled to said input region to provide a reference optical signal, means for apportioning said light energy between said photoelastic waveguide and said temperature independent waveguide at said input region, means for combining said reference optical signal from said temperature independent waveguide and a temperature dependent optical signal from said photoelastic waveguide to provide a temperature dependent output signal to said light detector, said source of light energy, said waveguides, said means for apportioning light energy and said means for combining said optical signals comprising single-mode light propagation means.

5. An optical waveguide temperature sensor, comprising:

an optically transparent photoelastic substrate having a planar surface and an input region whereat light energy is coupled for guidance therein, an index of refraction responsive to stress applied thereto, and a first thermal coefficient of expansion, a film having a second thermal coefficient of expansion deposited upon said planar surface of said substrate in a predetermined pattern extending from said input region to an output region, said film defining at least one photoelastic waveguide proximate thereto and residing within said substrate, corresponding to a region of stress induced change in index of refraction responsive to said temperature changes, for coupling at least a portion of said light energy from said input region to said output region, differences of said first and second thermal coefficients of expansion applying a stress to said substrate that varies said index of refraction corresponding to said waveguide, said variation in index of refraction varying said portion of light inversely according to said temperature changes, an optical waveguide essentially independent of temperature, disposed in said substrate, a coupled to said input region and having a longitudinal axis extending from said input region to said output region for propagating light wave energy incident thereto, said photoelastic waveguide disposed at a predetermined angle to said longitudinal axis, for propagating or reflecting portions of light wave energy incident on said temperature independent waveguide in accordance with changes in said index of refraction of said photoelastic waveguide.

6. Apparatus for optically sensing temperature changes, of the type having a source of light energy, a light detector, and temperature sensing means interposed between said source and said detector, wherein said temperature sensing means comprises:

an optically transparent photoelastic substrate having a planar surface and an input region whereat light energy is coupled for guidance therein, an index of refraction responsive to stress applied thereto, a first thermal coefficient of expansion, and an output region coincident with said input region for extracting at least a portion of said light energy, a film having a second thermal coefficient of expansion deposited upon said planar surface of said substrate in a predetermined pattern extending from said input region to said output region, said film defining a plurality of photoelastic waveguides proximate thereto and residing within said substrate, corresponding to a region of stress induced change in index of refraction responsive to said temperature changes, for coupling said portion of said light energy from said input region to said output region, differences of said first and second thermal coefficients of expansion applying a stress to said substrate that varies said index of refraction corresponding to said waveguide, said variation in index of refraction varying portions of light inversely according to said temperature changes, said substrate further comprised of a substantially planar focal surface for receiving said light energy, said substrate additionally including a circularly cylindrical surface opposite said focal surface and a circularly cylindrical reflector means opposite said focal surface at said cylindric surface, said reflector means having a center of curvature lying substantially symmetrically at said planar focal surface, further comprising optical fiber means having a first end for excitation by said source of light energy coupled to a second end in abutting relationship with said focal surface for illuminating a portion of said reflector means, and a third end also coupled to said focal surface for energizing said light detector, said first, second, and third ends coupled through bidirectional optical coupler means, said film patterned to define a plurality of tapered elements having respective large ends disposed adjacent said cylindrical surface and respective pointed ends disposed adjacent said focal surface, said tapered elements being symmetrically disposed with respect to said center of curvature, pairs of said elements defining ones of said plurality of photoelastic waveguides therebetween, so that light energy illuminating said reflector means is diverted from said center of curvature responsive to index of refraction changes of said photoelastic waveguides according to temperature changes of said substrate.

* * * * *